United States Patent
Prasad

(10) Patent No.: US 10,467,484 B2
(45) Date of Patent: Nov. 5, 2019

(54) DRIVER FATIGUE WARNING SYSTEM

(71) Applicant: Aptiv Technologies Limited, St. Michael (BB)

(72) Inventor: Premchand Krishna Prasad, Carmel, IN (US)

(73) Assignee: APTIV TECHNOLOGIES LIMITED (BB)

( * ) Notice: Subject to any disclaimer, the term of this patent is extended or adjusted under 35 U.S.C. 154(b) by 112 days.

(21) Appl. No.: 15/611,273

(22) Filed: Jun. 1, 2017

(65) Prior Publication Data

US 2018/0349711 A1 Dec. 6, 2018

(51) Int. Cl.
*H04N 7/18* (2006.01)
*G06K 9/00* (2006.01)
(Continued)

(52) U.S. Cl.
CPC .......... *G06K 9/00798* (2013.01); *B60K 28/06* (2013.01); *B60Q 9/00* (2013.01); *B60W 40/08* (2013.01); *B62D 15/025* (2013.01); *G01S 13/08* (2013.01); *G01S 13/867* (2013.01); *G01S 15/025* (2013.01); *G01S 15/08* (2013.01); *G01S 17/023* (2013.01); *G01S 17/08* (2013.01); *G08B 21/06* (2013.01); *G08G 1/165* (2013.01); *G08G 1/166* (2013.01); *G08G 1/167* (2013.01); *H04N 7/183* (2013.01); *B60W 2040/0818* (2013.01);
(Continued)

(58) Field of Classification Search
CPC ........... G06K 9/00798; G06K 9/00791; G08G 1/166; G08G 1/167; G08G 1/165; G08B 21/06; B62D 15/025; B60K 28/06; H04N 7/183; B60Q 9/00; B60W 2040/0827; B60W 2040/0818; B60W 40/08; G01S 2013/9364; G01S 13/931; G01S 2013/9367; G01S 13/08; G01S 13/867; G01S 15/025; G01S 17/023; G01S 17/08; G01S 15/08
USPC ........................................................ 348/148
See application file for complete search history.

(56) References Cited

U.S. PATENT DOCUMENTS

2016/0052516 A1\* 2/2016 Kim .................. B60Q 9/00
701/519
2017/0028915 A1\* 2/2017 Lee ................... B60Q 9/008

FOREIGN PATENT DOCUMENTS

DE 102 54 247 A1 6/2004
DE 10 2009 009975 A1 4/2010
(Continued)

*Primary Examiner* — Richard T Torrente
(74) *Attorney, Agent, or Firm* — Joseph V. Bonadies

(57) ABSTRACT

A driver-fatigue warning system suitable for use in an automated vehicle includes a camera, an alert-device, and a controller. The camera renders an image of a lane-marking and of an object proximate to a host-vehicle. The alert-device is operable to alert an operator of the host-vehicle of driver-fatigue. The controller is in communication with the camera and the alert-device. The controller determines a vehicle-offset of the host-vehicle relative to the lane-marking based on the image. The controller determines an offset-position of the object relative to the lane-marking based on the image. The controller determines that a lane-departure has occurred when the vehicle-offset is less than a deviation-threshold. The controller does not count occurrences of lane-departures when the offset-position is less than an offset-threshold, and activates the alert-device when the count of the occurrences of lane-departures exceeds a crossing-threshold indicative of driver-fatigue.

17 Claims, 12 Drawing Sheets

(51) Int. Cl.
  *B60W 40/08*   (2012.01)
  *B60Q 9/00*    (2006.01)
  *G01S 13/86*   (2006.01)
  *G01S 15/02*   (2006.01)
  *G01S 17/02*   (2006.01)
  *G01S 17/08*   (2006.01)
  *G01S 15/08*   (2006.01)
  *G01S 13/08*   (2006.01)
  *B60K 28/06*   (2006.01)
  *B62D 15/02*   (2006.01)
  *G08B 21/06*   (2006.01)
  *G08G 1/16*    (2006.01)
  *G01S 13/93*   (2006.01)

(52) U.S. Cl.
  CPC .... *B60W 2040/0827* (2013.01); *G01S 13/931* (2013.01); *G01S 2013/9364* (2013.01); *G01S 2013/9367* (2013.01); *G06K 9/00791* (2013.01)

(56) References Cited

FOREIGN PATENT DOCUMENTS

EP    0 896 918 A2    2/1999
WO    2005/119624 A1  12/2005

* cited by examiner

DRIVER FATIGUE WARNING SYSTEM

TECHNICAL FIELD OF INVENTION

This disclosure generally relates to a driver-fatigue warning system, and more particularly relates to a driver-fatigue warning system that does not penalize a driver for avoiding an object.

BACKGROUND OF INVENTION

It is known to detect a driver's level of fatigue by tracking a lane-keeping-performance that determines how well a driver maintains a lane-position. Excessive movement within a lane and/or excessive lane-departures may indicate an unsafe level of driver-fatigue and may lead to an activation of an alert-device that alerts the driver to their lowered level of responsiveness.

SUMMARY OF THE INVENTION

In accordance with one embodiment, a driver-fatigue warning system is provided. The driver-fatigue warning system suitable for use in an automated vehicle includes a camera, an alert-device, and a controller. The camera renders an image of a lane-marking and of an object proximate to a host-vehicle. The alert-device is operable to alert an operator of the host-vehicle of driver-fatigue. The controller is in communication with the camera and the alert-device. The controller determines a vehicle-offset of the host-vehicle relative to the lane-marking based on the image. The controller determines an offset-position of the object relative to the lane-marking based on the image. The controller determines that a lane-departure has occurred when the vehicle-offset is less than a deviation-threshold. The controller does not count occurrences of lane-departures when the offset-position is less than an offset-threshold, and activates the alert-device when the count of the occurrences of lane-departures exceeds a crossing-threshold indicative of driver-fatigue.

In another embodiment, a method of operating a driver-fatigue warning system suitable for use in an automated vehicle is provided. The method includes the steps of rendering an image, alerting an operator, determining a vehicle-offset, determining a lane-departure, determining an offset-position, and activating an alert-device. The step of rendering an image, may include rendering, with a camera, an image of a lane-marking and of an object proximate to a host-vehicle. The step of alerting an operator, may include, alerting, with an alert-device, an operator of the host-vehicle of driver-fatigue. The step of determining the vehicle-offset, may include determining, with a controller in communication with the camera and the alert-device, the vehicle-offset of the host-vehicle relative to the lane-marking based on the image. The step of determining the offset-position, may include determining the offset-position of the object relative to the lane-marking based on the image. The step of determining the lane-departure, may include determining that the lane-departure has occurred when the vehicle-offset is less than a deviation-threshold, and not counting occurrences of lane-departures when the offset-position is less than an offset-threshold. The step of activating the alert-device, may include activating the alert-device when the count of the occurrences of lane-departures exceeds a crossing-threshold indicative of driver-fatigue.

In yet another embodiment, an automated vehicular warning system is provided. The automated vehicular warning system includes a camera, an alert-device, and a controller in communication with the camera and the alert-device. The controller counts a lane-departure of a host-vehicle when a host-vehicle-offset relative to a lane-marking is less than a threshold. The controller does not count the lane-departure when an object in a roadway urges an operator of the host-vehicle to perform the lane-departure. The controller activates the alert-device when the count of the lane-departures exceeds a departure-threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

A typical driver-fatigue system detects whether an operator of a host-vehicle is drowsy or fatigued by measuring a lane-keeping-performance. The typical lane-keeping-performance algorithm estimates an operator's ability to drive the host-vehicle along a centerline of a travel-lane by detecting certain sequences of events, and/or a lack of steering-activity. Events that are indicative of driver-fatigue include, but are not limited to, a variation in a lateral-offset of the host-vehicle from the centerline, and/or no steering-activity while the host-vehicle drifts away from the centerline followed by a sudden steering-correction back to the centerline (a.k.a. Swivel). It is known in the art that a significant increase in a number of lane-crossings, without the use of signaling, may be an indicator of driver-fatigue.

While the typical lane-keeping-performance algorithm may accurately estimate the driver-fatigue under ideal traffic conditions, situations exist where the operator may intentionally perform a lane-departure to avoid an object in an adjacent-lane or on a shoulder of a roadway (e.g. an over-size-load being transported or an other-vehicle stopped on the shoulder), or to avoid an object in the travel-lane (e.g. a pot-hole or debris). While these lane-departures may be associated with cautious and/or courteous driving maneuvers, they may be counted by the typical lane-keeping-performance algorithm as an indication of driver-fatigue, and may lead to a false driver-fatigue warning. As will be described in more detail below, the system described herein is an improvement over prior driver-fatigue warning systems because the system reduces the rates of the false driver-fatigue warning by determining when to count the lane-departure, which may help to reduce occurrences of operators intentionally deactivating the driver-fatigue warning system.

Figure 1:
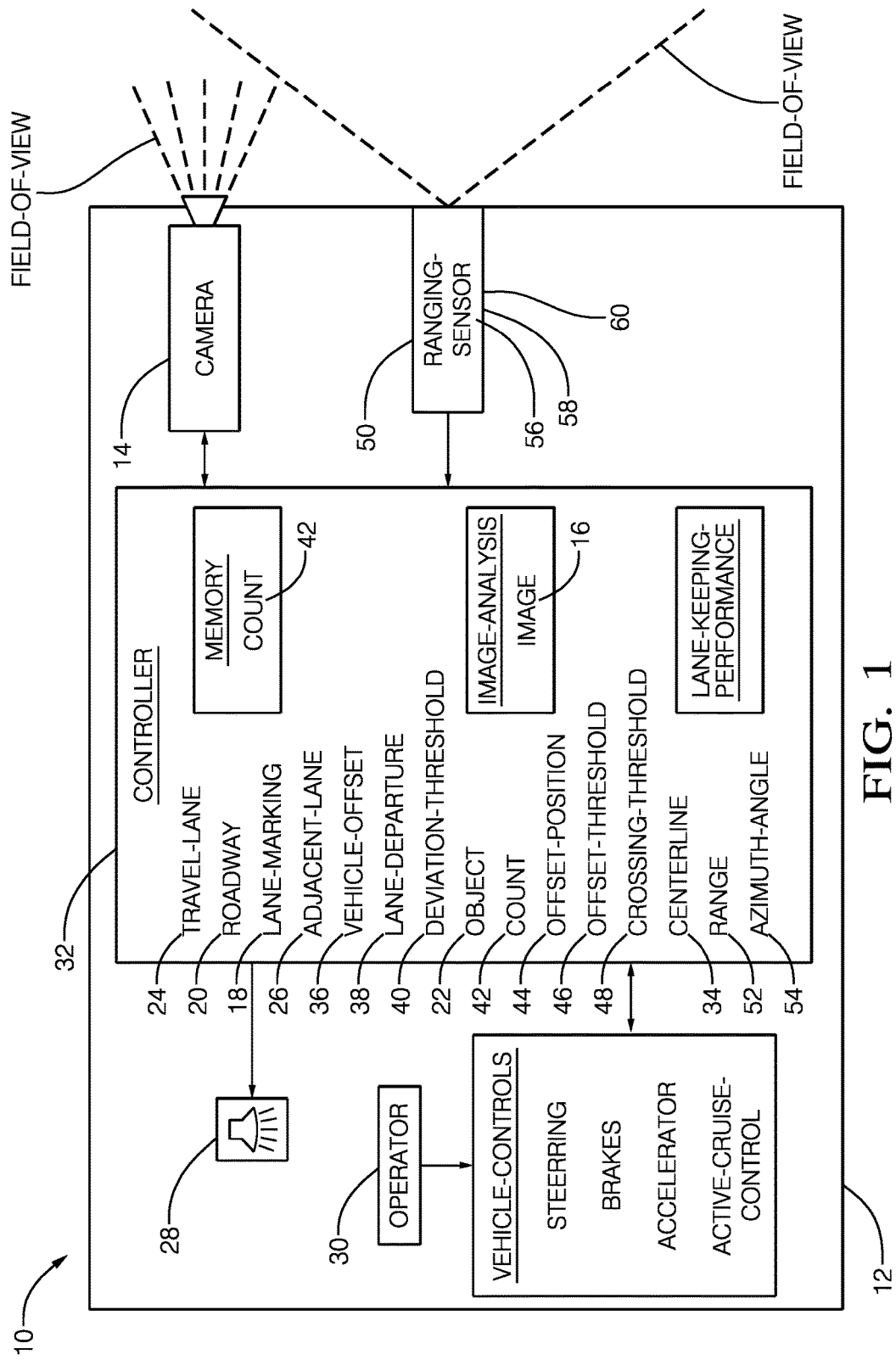
FIG. 1 is an illustration of a driver-fatigue warning system in accordance with one embodiment.

FIG. 1 illustrates a non-limiting example of a driver-fatigue warning system 10, hereafter referred to as the system 10, suitable for use in an automated vehicle 12, hereafter referred to as a host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency braking to the human. The system 10 includes a camera 14 that renders an image 16 of a lane-marking 18 of a roadway 20 and of an object 22 proximate to the host-vehicle 12. Examples of the camera 14 suitable for use on the host-vehicle 12 are commercially available as will be recognized by those in the art, one such being the APTINA MT9V023 from Micron Technology, Inc. of Boise, Id., USA. The camera 14 may be mounted on the front of the host-vehicle 12, or mounted in the interior of the host-vehicle 12 at a location suitable for the camera 14 to view the area around the host-vehicle 12 through the wind-shield of the host-vehicle 12. The camera 14 is preferably a video-type camera 14 or camera 14 that can capture images 16 of the roadway 20 and surrounding area at a sufficient frame-rate, of ten frames per second, for example. A travel-lane 24 may be defined by the lane-markings 18, or may be defined by edges of pavement if no lane-markings 18 are detected. The image 16 may include, but is not limited to, the lane-marking 18 on a left-side and on a right-side of the travel-lane 24 of the roadway 20. The image 16 may also include the lane-marking 18 in an adjacent-lane 26. The lane-marking 18 may include a solid-line, a dashed-line, or any combination thereof.

The system 10 also includes an alert-device 28 operable to alert an operator 30 of the host-vehicle 12 of driver-fatigue. The alert-device 28 may be an indicator viewable by the operator 30 that is illuminated to indicate an instance of driver-fatigue, and/or an audible alarm, and/or a vibratory alarm that is activated to indicate the same.

The system 10 also includes a controller 32 in communication with the camera 14 and the alert-device 28. The controller 32 may include a processor (not shown) such as a microprocessor or other control circuitry such as analog and/or digital control circuitry including an application specific integrated circuit (ASIC) for processing data as should be evident to those in the art. The controller 32 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of driver-fatigue exists based on signals received by the controller 32 from the camera 14 as described herein.

The controller 32 may receive the image 16, via a video-signal (not shown), and may determine both a lane-width (not specifically shown) and a centerline 34 of the travel-lane 24 based on the lane-marking 18. That is, the image 16 detected or captured by the camera 14 is processed by the controller 32 using known techniques for image-analysis to determine where along the roadway 20 the host-vehicle 12 should be operated or be steered. Vision processing technologies, such as the EyeQ® platform from Moblieye Vision Technologies, Ltd. of Jerusalem, Israel, or other suitable devices may be used. By way of example and not limitation, the centerline 34 is preferably in the middle of the travel-lane 24 traveled by the host-vehicle 12.

Figure 2:
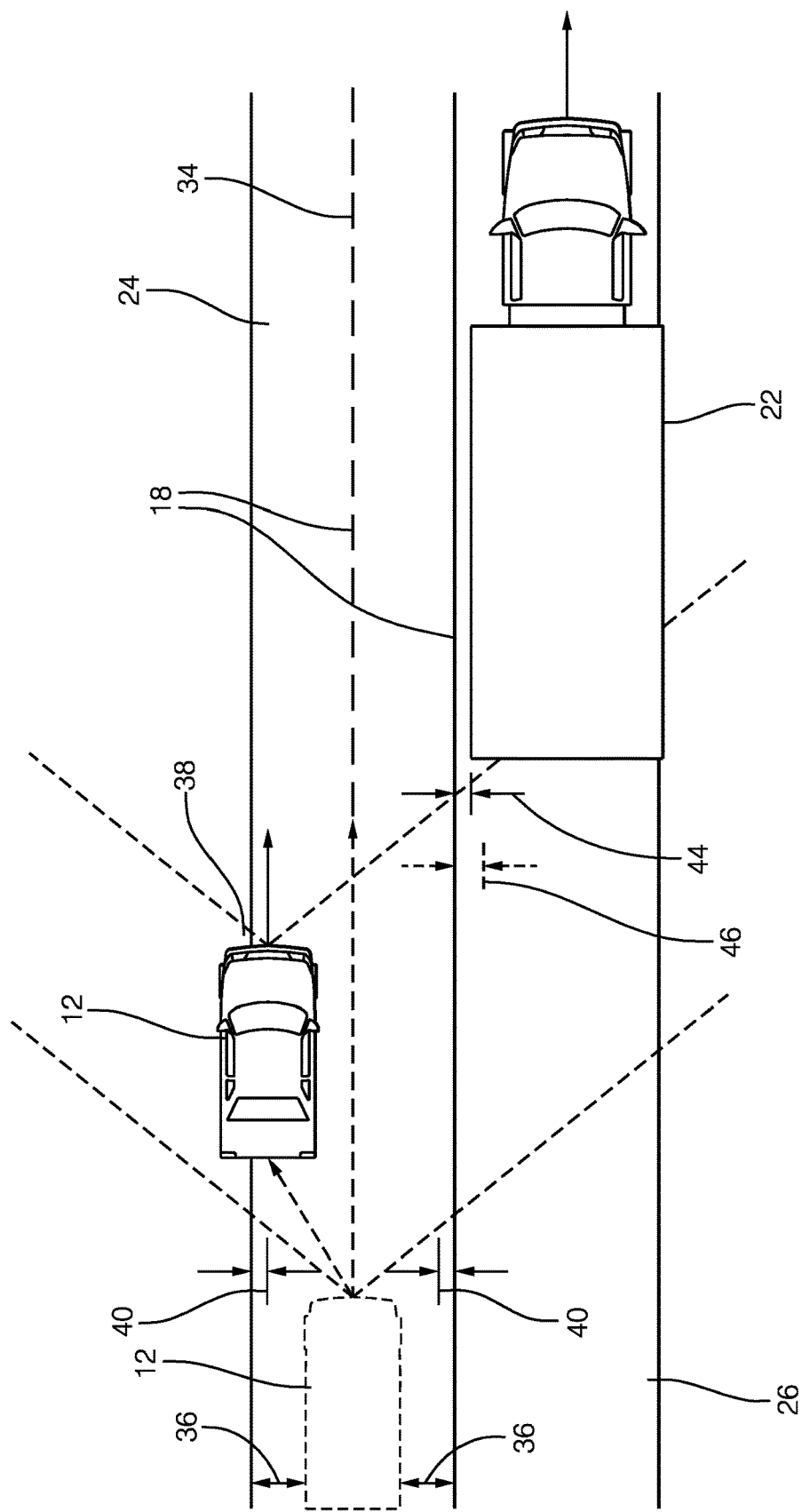
FIG. 2 is an illustration of a host-vehicle equipped with the driver-fatigue warning system of FIG. 1 making a lane-departure in accordance with one embodiment.

FIG. 2 illustrates a traffic scenario where the host-vehicle 12 is approaching the object 22 (i.e. an oversize-load) that is traveling in the adjacent-lane 26. The operator 30 of the host-vehicle 12 makes an intentional lane-departure 38, as is indicated by a perimeter of the host-vehicle 12 overlaying the lane-marking 18 on the left-side of the travel-lane 24, to provide greater clearance between the host-vehicle 12 and the object 22. The controller 32 determines a vehicle-offset 36 of the host-vehicle 12 relative to the lane-marking 18 based on the image 16 received from the camera 14. The vehicle-offset 36 is a measure of a distance from both a left-side and a right-side of the host-vehicle 12 to the lane-marking 18. The controller 32 determines that the lane-departure 38 has occurred when the vehicle-offset 36 is less than a deviation-threshold 40. The deviation-threshold 40 as used herein is defined as a minimum allowable distance from the left-side and/or the right-side of the host-vehicle 12 to the lane-marking 18. The deviation-threshold 40 may be user-defined and may be any distance needed to meet the requirements of the host-vehicle 12, and may be in a range from between zero meters (0.0 meters) to 0.75 meters. The deviation-threshold 40 may vary based on a width of the host-vehicle 12 and/or may vary based on the width of the travel-lane 24. An occurrence of the lane-departure 38 may be counted 42 by the controller 32 and may be stored in the memory for estimating the operator's 30 lane-keeping-performance.

As illustrated in FIG. 2, the controller 32 also determines an offset-position 44 of the object 22 relative to the lane-marking 18 based on the image 16. The offset-position 44 is defined as the distance from either the left-side or the right-side of the object 22 to the lane-marking 18 of the travel-lane 24 traveled by the host-vehicle 12. The controller 32 also determines an offset-threshold 46 defined as the minimum allowable distance from the left-side and/or the right-side of the object 22 to the lane-marking 18 of the travel-lane 24 traveled by the host-vehicle 12 (shown on the left-side of the object 22 in FIG. 2 for illustration purposes only). The offset-threshold 46 may be user-defined and may be any distance needed to meet the requirements of the host-vehicle 12, and may be in the range from between 0.0 meters to 0.75 meters. The offset-threshold 46 may vary based on a width of the object 22 and/or may vary based on the width of the travel-lane 24, and/or may vary based on the width of the host-vehicle 12.

The controller 32 does not count occurrences of the lane-departures 38 of the host-vehicle 12 when the offset-position 44 is less than the offset-threshold 46 as illustrated in FIG. 2. By not counting 42 the occurrences of the lane-departures 38 under the aforementioned conditions, the system 10 does not penalize the operator 30 of the host-vehicle 12 when the operator 30 makes an intentional lane-departure 38 to provide greater clearance between the host-vehicle 12 and the detected object 22.

Figure 3:
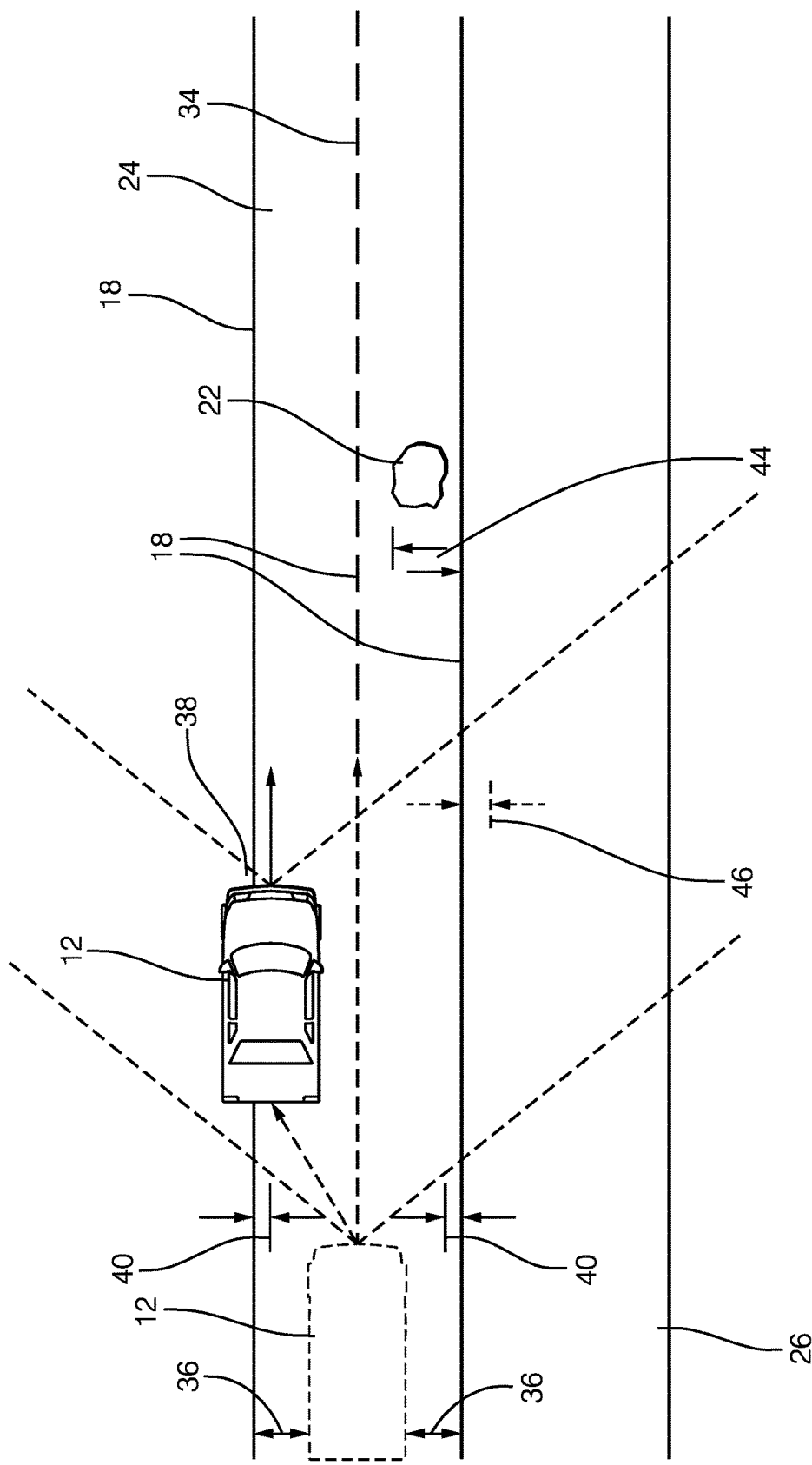
FIG. 3 is an illustration of the host-vehicle of FIG. 2 making a lane-departure in accordance with one embodiment.

FIG. 3 illustrates another traffic scenario where the operator 30 of the host-vehicle 12 makes the intentional lane-departure 38 in to provide greater clearance between the host-vehicle 12 and the detected object 22 (e.g. a pot-hole and/or debris) located in the travel-lane 24 traveled by the host-vehicle 12 that is perceived as a hazard by the operator 30. As illustrated in FIG. 3, the operator 30 makes the lane-departure 38 to the left-side of the travel-lane 24. The controller 32 does not count the occurrence of the lane-departure 38 when the offset-position 44 (illustrated as a negative value of distance from the lane-marking 18) is less than the offset-threshold 46 as illustrated in FIG. 3. The location of the detected object 22 may urge the operator 30 to make the intentional lane-departure 38 to either-side of the object 22 and will not be counted 42 by the controller 32.

Figure 4:
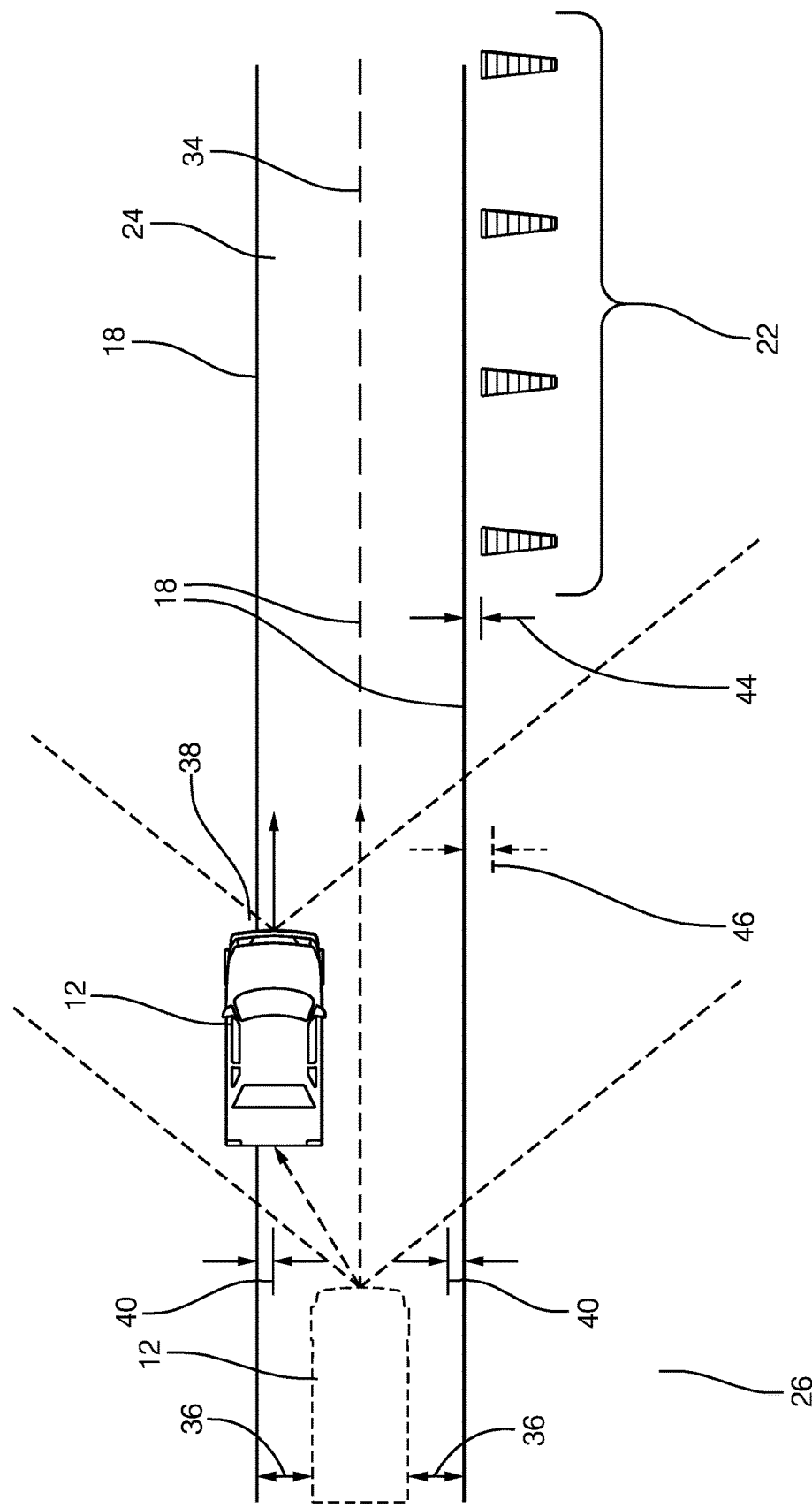
FIG. 4 is an illustration of the host-vehicle of FIG. 2 making a lane-departure in accordance with one embodiment.

FIG. 4 illustrates yet another traffic scenario where the operator 30 of the host-vehicle 12 makes the intentional lane-departure 38 to provide greater clearance between the host-vehicle 12 and the detected object 22 (e.g. construction pylons) located on the shoulder of the travel-lane 24 that are perceived as the hazard by the operator 30. As illustrated in FIG. 4, the operator 30 is making the lane-departure 38 to the left-side of the travel-lane 24. The controller 32 does not count the occurrence of the lane-departure 38 when the offset-position 44 is less than the offset-threshold 46.

Figure 5:
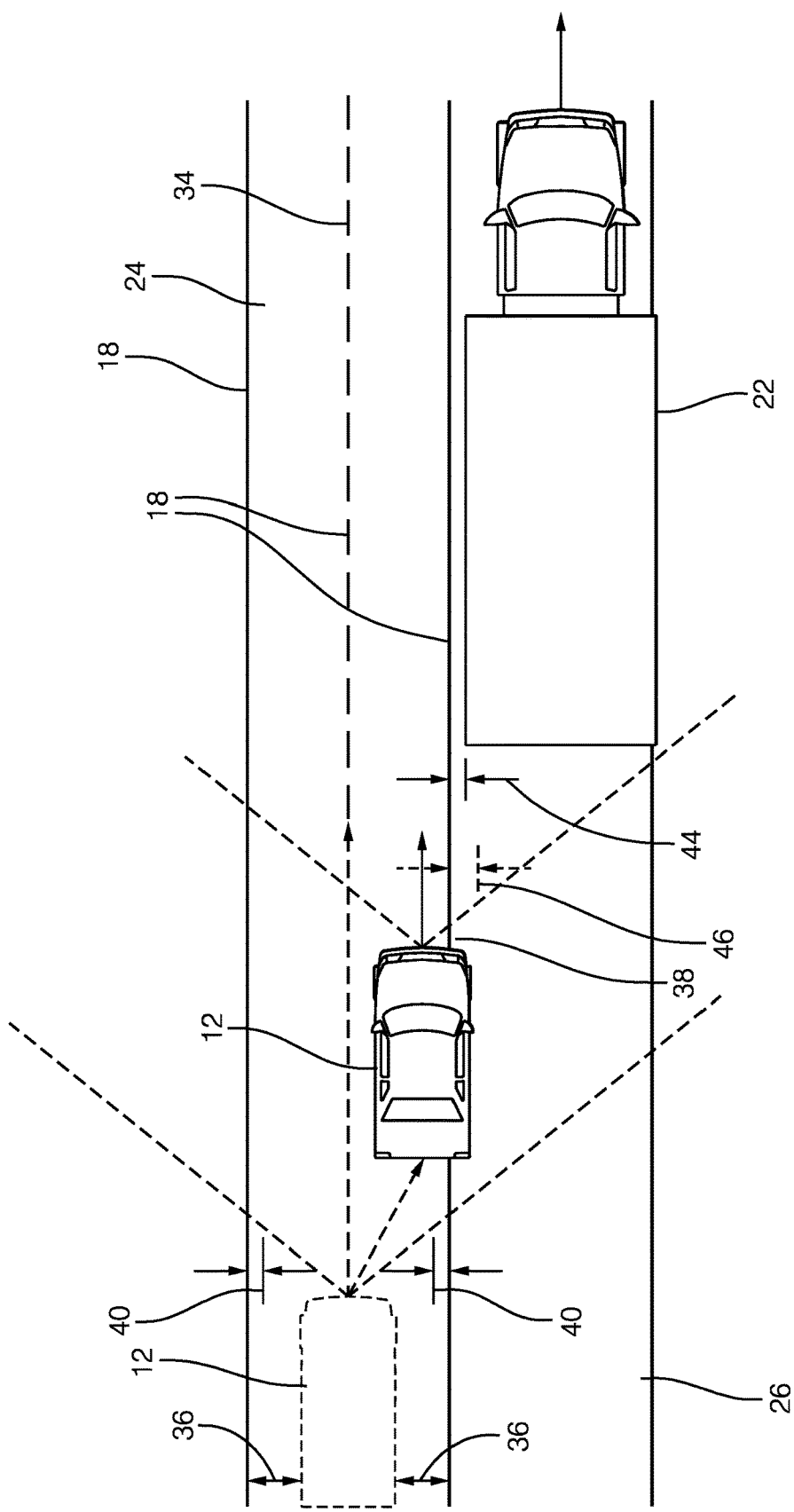
FIG. 5 is an illustration of the host-vehicle of FIG. 2 making a lane-departure in accordance with one embodiment.

FIG. 5 illustrates yet another traffic scenario where the controller 32 further determines that the object 22 (e.g. the oversize-load) is in the adjacent-lane 26, and determines that the lane-departure 38 also occurs into the adjacent-lane 26. In contrast to the traffic scenario illustrated in FIG. 2, the controller 32 counts 42 the lane-departure 38 illustrated in FIG. 5 because the host-vehicle 12 moves closer to the object 22 without signaling the maneuver, which may be indicative of driver-fatigue.

The controller 32 activates the alert-device 28 when the count 42 of the occurrences of lane-departures 38 exceeds a crossing-threshold 48 (see FIG. 1) indicative of driver-fatigue. The crossing-threshold 48 may be any number of occurrences of lane-departures 38 within a defined time-period, and is preferably in the range from between 2 to 3 lane-departures 38 within the time-period of two minutes.

Returning to FIG. 1, the system 10 may further include a ranging-sensor 50 in communication with the controller 32. The ranging-sensor 50 may detect a range 52, and an azimuth-angle 54 of the object 22 relative to a host-vehicle-longitudinal-axis (not shown). The ranging-sensor 50 may be a radar 56 such as the radar-sensor from Delphi Inc. of Troy, Mich., USA and marketed as an Electronically Scanning Radar (ESR) or a Rear-Side-Detection-System (RSDS), or Short-Range-Radar (SRR) or the ranging-sensor 50 may be a lidar 58, or the ranging-sensor 50 may be an ultrasonic-transducer 60 such as the TIDA-00151 from Texas Instruments of Dallas, Tex., USA. The controller 32 may further determine the offset-position 44 of the object 22 based on the range 52 and the azimuth-angle 54, as will be understood by those in the art.

Figure 6:
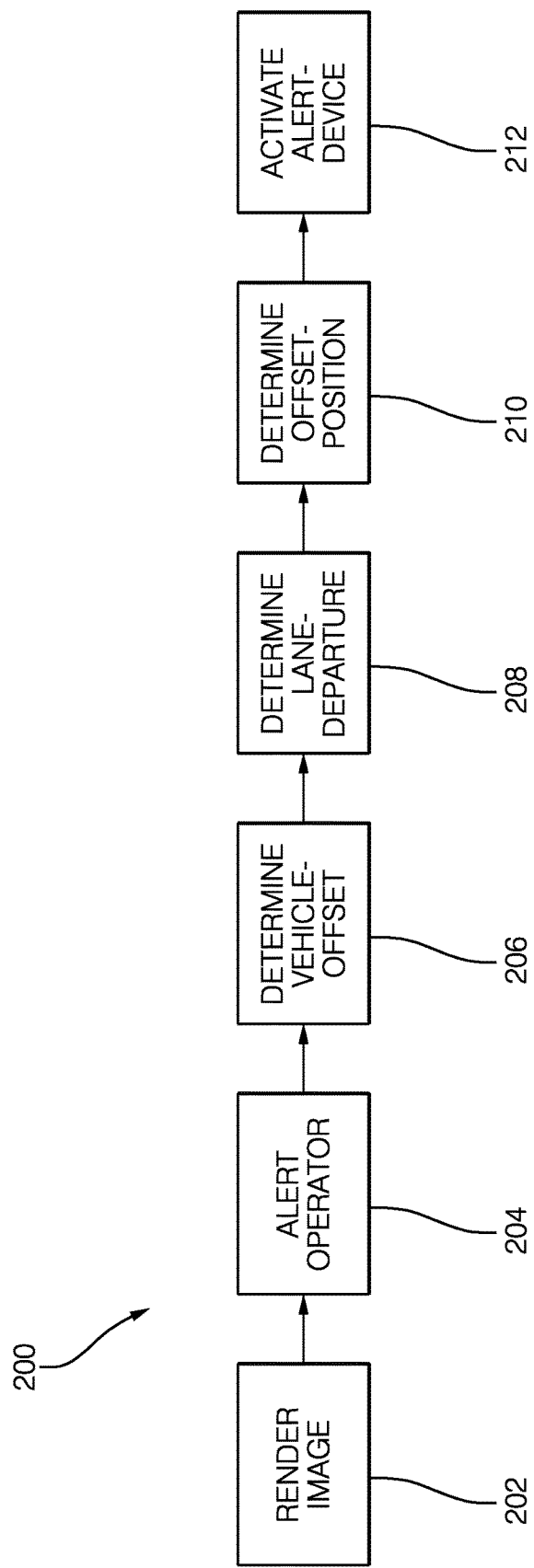
FIG. 6 is a flow chart of a method of operating a driver-fatigue warning system in accordance with another embodiment.

FIG. 6 illustrates a non-limiting example of a method 200 of operating a driver-fatigue warning system 10 illustrated in FIG. 1, hereafter referred to as the system 10, suitable for use in an automated vehicle, hereafter referred to as a host-vehicle 12. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency braking to the human.

Step 202, RENDER IMAGE, may include the step of rendering, with a camera 14, an image 16 of a lane-marking 18 of a roadway 20 and of an object 22 proximate to the host-vehicle 12. Examples of the camera 14 suitable for use on the host-vehicle 12 are commercially available as will be recognized by those in the art, one such being the APTINA MT9V023 from Micron Technology, Inc. of Boise, Id., USA. The camera 14 may be mounted on the front of the host-vehicle 12, or mounted in the interior of the host-vehicle 12 at a location suitable for the camera 14 to view the area around the host-vehicle 12 through the windshield of the host-vehicle 12. The camera 14 is preferably a video-type camera 14 or camera 14 that can capture images 16 of the roadway 20 and surrounding area at a sufficient frame-rate, of ten frames per second, for example. A travel-lane 24 may be defined by the lane-markings 18, or may be defined by edges of pavement if no lane-markings 18 are detected. The image 16 may include, but is not limited to, the lane-marking 18 on a left-side and on a right-side of the travel-lane 24 of the roadway 20. The image 16 may also include the lane-marking 18 in an adjacent-lane 26. The lane-marking 18 may include a solid-line, a dashed-line, or any combination thereof.

Step 204, ALERT OPERATOR, may include the step of alerting, with an alert-device 28, an operator 30 of the host-vehicle 12 of driver-fatigue. The alert-device 28 may be an indicator viewable by the operator 30 that is illuminated to indicate an instance of driver-fatigue, and/or an audible alarm, and/or a vibratory alarm that is activated to indicate the same.

Step 206, DETERMINE VEHICLE-OFFSET, may include determining, with a controller 32 in communication with the camera 14 and the alert-device 28, a vehicle-offset 36 of the host-vehicle 12 relative to the lane-marking 18 based on the image 16. The controller 32 may include a processor (not shown) such as a microprocessor or other control circuitry such as analog and/or digital control circuitry including an application specific integrated circuit (ASIC) for processing data as should be evident to those in the art. The controller 32 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of driver-fatigue exists based on signals received by the controller 32 from the camera 14 as described herein.

The controller 32 may receive the image 16, via a video-signal (not shown), and may determine both a lane-width (not specifically shown) and a centerline 34 of the travel-lane 24 based on the lane-marking 18. That is, the image 16 detected or captured by the camera 14 is processed by the controller 32 using known techniques for image-analysis to determine where along the roadway 20 the host-vehicle 12 should be operated or be steered. Vision processing technologies, such as the EyeQ® platform from Moblieye Vision Technologies, Ltd. of Jerusalem, Israel, or other suitable devices may be used. By way of example and not limitation, the centerline 34 is preferably in the middle of the travel-lane 24 traveled by the host-vehicle 12.

FIG. 2 illustrates a traffic scenario where the host-vehicle 12 is approaching the object 22 (i.e. an oversize-load) that is traveling in the adjacent-lane 26. The operator 30 of the host-vehicle 12 makes an intentional lane-departure 38, as is indicated by a perimeter of the host-vehicle 12 overlaying the lane-marking 18 on the left-side of the travel-lane 24, to provide greater clearance between the host-vehicle 12 and the object 22. The controller 32 determines the vehicle-offset 36 of the host-vehicle 12 relative to the lane-marking 18 based on the image 16 received from the camera 14. The vehicle-offset 36 is a measure of a distance from both a left-side and a right-side (not specifically shown) of the host-vehicle 12 to the lane-marking 18.

Step 208, DETERMINE LANE-DEPARTURE, may include the step of determining, with the controller 32, that the lane-departure 38 has occurred when the vehicle-offset 36 is less than a deviation-threshold 40. The deviation-threshold 40 as used herein is defined as a minimum allowable distance from the left-side and/or the right-side of the host-vehicle 12 to the lane-marking 18. The deviation-threshold 40 may be user-defined and may be any distance needed to meet the requirements of the host-vehicle 12, and may be in a range from between zero meters (0.0 meters) to 0.75 meters. The deviation-threshold 40 may vary based on a width of the host-vehicle 12 and/or may vary based on the width of the travel-lane 24. An occurrence of the lane-departure 38 may be counted 42 by the controller 32 and may be stored in the memory for estimating the operator's 30 lane-keeping-performance.

Step 210, DETERMINE OFFSET-POSITION, may include the step of determining, with the controller 32, an offset-position 44 of the object 22 relative to the lane-marking 18 based on the image 16. The offset-position 44 is defined as the distance from either the left-side or the right-side of the object 22 to the lane-marking 18 of the travel-lane 24 traveled by the host-vehicle 12. The controller also determines an offset-threshold 46 defined as the minimum allowable distance from the left-side and/or the right-side of the object 22 to the lane-marking 18 of the travel-lane 24 traveled by the host-vehicle 12 (shown only on the left-side of the object 22 in FIG. 2 for illustration purposes only). The offset-threshold 46 may be user-defined and may be any distance needed to meet the requirements of the host-vehicle 12, and may be in the range from between 0.0 meters to 0.75 meters. The offset-threshold 46 may vary based on a width of the object 22 and/or may vary based on the width of the travel-lane 24, and/or may vary based on the width of the host-vehicle 12.

The controller 32 does not count occurrences of the lane-departures 38 of the host-vehicle 12 when the offset-position 44 is less than the offset-threshold 46 as illustrated in FIG. 2. By not counting 42 the occurrences of the lane-departures 38 under the aforementioned conditions, the system 10 does not penalize the operator 30 of the host-vehicle 12 when the operator 30 makes an intentional lane-departure 38 to provide greater clearance between the host-vehicle 12 and the detected object 22.

FIG. 3 illustrates another traffic scenario where the operator 30 of the host-vehicle 12 makes the intentional lane-departure 38 to provide greater clearance between the host-vehicle 12 and the detected object 22 (e.g. a pot-hole and/or debris) located in the travel-lane 24 traveled by the host-vehicle 12 that is perceived as a hazard by the operator 30. As illustrated in FIG. 3, the operator 30 makes the lane-departure 38 to the left-side of the travel-lane 24. The controller 32 does not count the occurrence of the lane-departure 38 when the offset-position 44 (illustrated as a negative value of distance from the lane-marking 18) is less than the offset-threshold 46 as illustrated in FIG. 3. The location of the detected object 22 may urge the operator 30 to make the intentional lane-departure 38 to either-side of the object 22 and will not be counted 42 by the controller 32.

FIG. 4 illustrates yet another traffic scenario where the operator 30 of the host-vehicle 12 makes the intentional lane-departure 38 to provide greater clearance between the host-vehicle 12 and the detected object 22 (e.g. construction pylons) located on the shoulder of the travel-lane 24 that are perceived as the hazard by the operator 30. As illustrated in FIG. 4, the operator 30 is making the lane-departure 38 to the left-side of the travel-lane 24. The controller 32 does not count the occurrence of the lane-departure 38 when the offset-position 44 is less than the offset-threshold 46.

FIG. 5 illustrates yet another traffic scenario where the controller 32 further determines that the object 22 (e.g. the oversize-load) is in the adjacent-lane 26, and determines that the lane-departure 38 also occurs into the adjacent-lane 26. In contrast to the traffic scenario illustrated in FIG. 2, the controller 32 counts 42 the lane-departure 38 illustrated in FIG. 5 because the host-vehicle 12 moves closer to the object 22 without signaling the maneuver, which may be indicative of driver-fatigue.

Step 212, ACTIVATE ALERT-DEVICE, may include the step of activating, with the controller 32, the alert-device 28 when the count 42 of the occurrences of lane-departures 38 exceeds a crossing-threshold 48 (see FIG. 1) indicative of driver-fatigue. The crossing-threshold 48 may be any number of occurrences of lane-departures 38 within a defined time-period, and is preferably in the range from between 2 to 3 lane-departures 38 within the time-period of two minutes.

Returning to FIG. 1, the system 10 may further include a ranging-sensor 50 in communication with the controller 32. The ranging-sensor 50 may detect a range 52, and an azimuth-angle 54 of the object 22 relative to a host-vehicle-longitudinal-axis (not shown). The ranging-sensor 50 may be a radar 56 such as the radar-sensor from Delphi Inc. of Troy, Mich., USA and marketed as an Electronically Scanning Radar (ESR) or a Rear-Side-Detection-System (RSDS), or Short-Range-Radar (SRR), or the ranging-sensor 50 may be a lidar 58, or the ranging-sensor 50 may be an ultrasonic-transducer 60 such as the TIDA-00151 from Texas Instruments of Dallas, Tex., USA. The controller 32 may further determine the offset-position 44 of the object 22 based on the range 52 and the azimuth-angle 54, as will be understood by those in the art.

Figure 7:
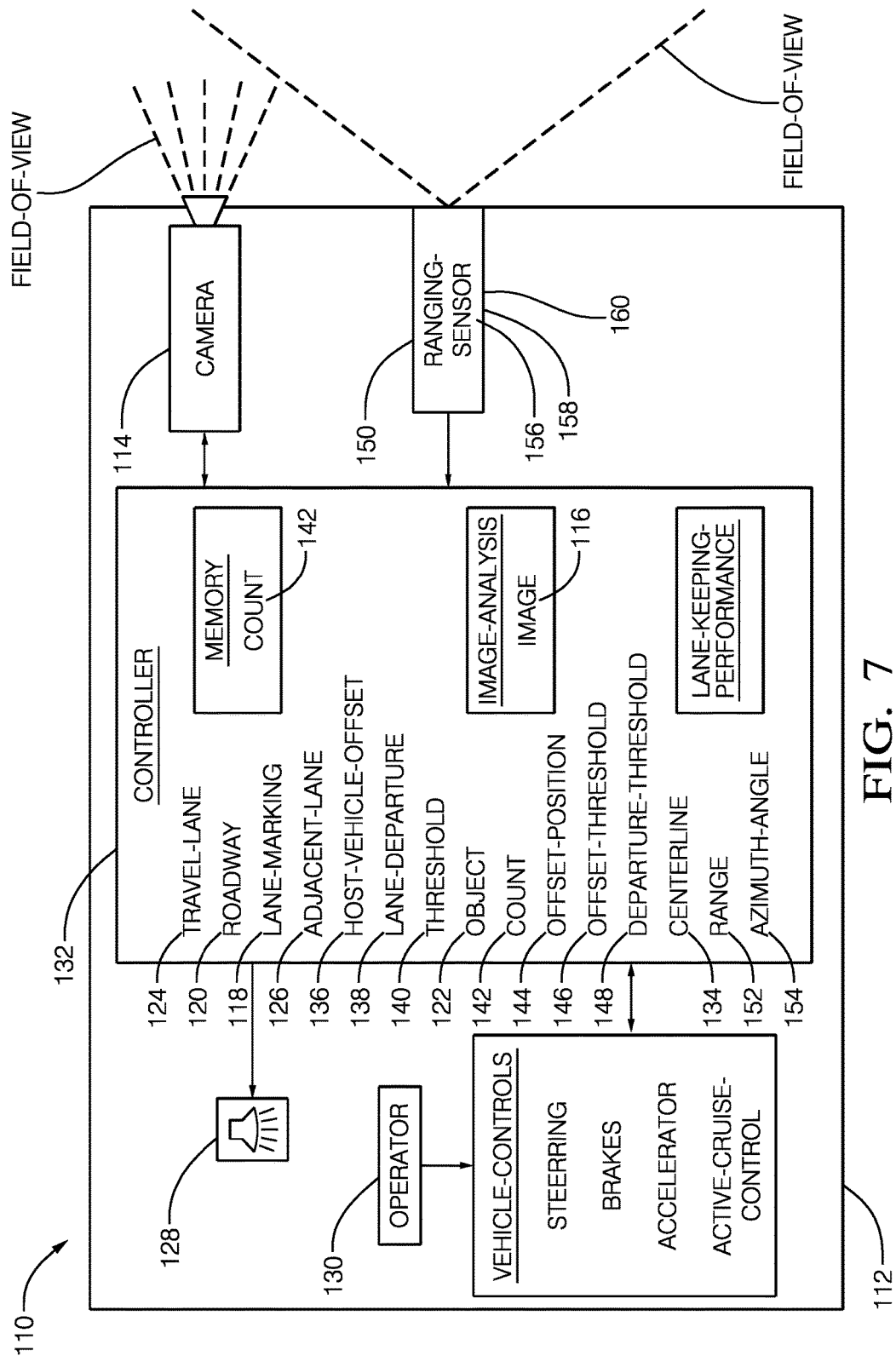
FIG. 7 is an illustration of an automated vehicular warning system in accordance with yet another embodiment.

FIG. 7 is a non-limiting example of yet another embodiment of an automated vehicular warning system 110, hereafter referred to as the system 110, suitable for use on an automated vehicle 112, hereafter referred to as a host-vehicle 112. As used herein, the term 'automated vehicle' is not meant to suggest that fully automated or autonomous operation of the host-vehicle 112 is required. It is contemplated that the teachings presented herein are applicable to instances where the host-vehicle 112 is entirely manually operated by a human and the automation is merely providing emergency braking to the human. The system 110 includes a camera 114 that renders an image 116 of a lane-marking 118 of a roadway 120 and of an object 122 proximate to the host-vehicle 112. Examples of the camera 114 suitable for use on the host-vehicle 112 are commercially available as will be recognized by those in the art, one such being the APTINA MT9V023 from Micron Technology, Inc. of Boise, Id., USA. The camera 114 may be mounted on the front of the host-vehicle 112, or mounted in the interior of the host-vehicle 112 at a location suitable for the camera 114 to view the area around the host-vehicle 112 through the windshield of the host-vehicle 112. The camera 114 is preferably a video-type camera 114 or camera 114 that can capture images 116 of the roadway 120 and surrounding area at a sufficient frame-rate, of ten frames per second, for example. A travel-lane 124 may be defined by the lane-markings 118, or may be defined by edges of pavement if no lane-markings 118 are detected. The image 116 may include, but is not limited to, the lane-marking 118 on a left-side and on a right-side of the travel-lane 124 of the roadway 120. The image 116 may also include the lane-marking 118 in an adjacent-lane 126. The lane-marking 118 may include a solid-line, a dashed-line, or any combination thereof.

The system 110 also includes an alert-device 128 operable to alert an operator 130 of the host-vehicle 112 of driver-fatigue. The alert-device 128 may be an indicator viewable by the operator 130 that is illuminated to indicate an instance of driver-fatigue, and/or an audible alarm, and/or a vibratory alarm that is activated to indicate the same.

The system 110 also includes a controller 132 in communication with the camera 114 and the alert-device 128. The controller 132 may include a processor (not shown) such as a microprocessor or other control circuitry such as analog and/or digital control circuitry including an application specific integrated circuit (ASIC) for processing data as should be evident to those in the art. The controller 132 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of driver-fatigue exists based on signals received by the controller 132 from the camera 114 as described herein.

The controller 132 may receive the image 116, via a video-signal (not shown), and may determine both a lane-width (not specifically shown) and a centerline 134 of the travel-lane 124 based on the lane-marking 118. That is, the image 116 detected or captured by the camera 114 is processed by the controller 132 using known techniques for image-analysis to determine where along the roadway 120 the host-vehicle 112 should be operated or be steered. Vision processing technologies, such as the EyeQ® platform from Moblieye Vision Technologies, Ltd. of Jerusalem, Israel, or other suitable devices may be used. By way of example and not limitation, the centerline 134 is preferably in the middle of the travel-lane 124 traveled by the host-vehicle 112.

Figure 8:
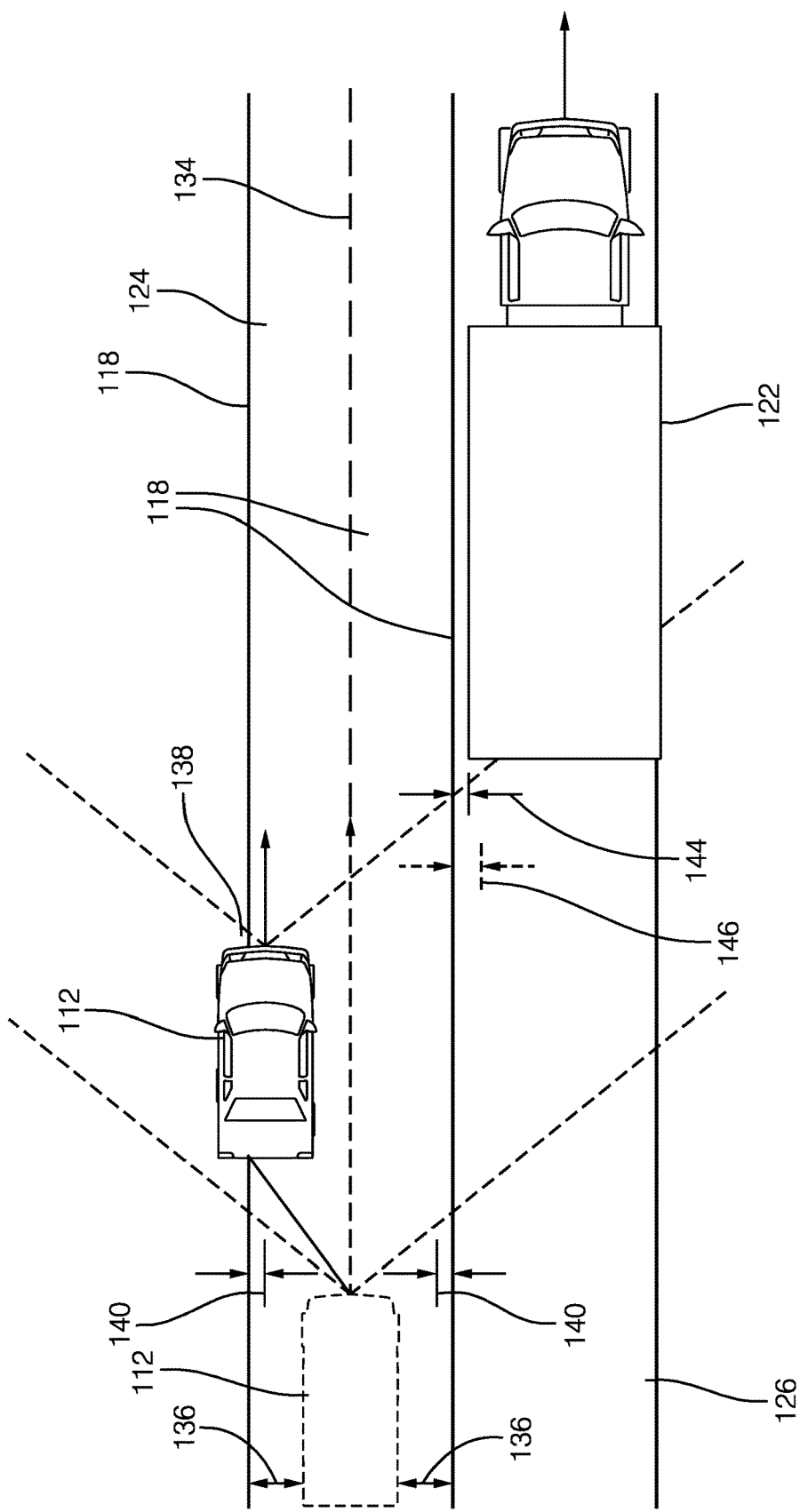
FIG. 8 is an illustration of a host-vehicle equipped with the automated vehicular warning system of FIG. 7 making a lane-departure in accordance with yet another embodiment.

FIG. 8 illustrates a traffic scenario where the host-vehicle 112 is approaching the object 122 (i.e. an oversize-load) that is traveling in the adjacent-lane 126. The operator 130 of the host-vehicle 112 makes an intentional lane-departure 138, as is indicated by a perimeter of the host-vehicle 112 overlaying the lane-marking 118 on the left-side of the travel-lane 124, to provide greater clearance between the host-vehicle 112 and the object 22. The controller 132 determines a host-vehicle-offset 136 of the host-vehicle 112 relative to the lane-marking 118 based on the image 116 received from the camera 114. The host-vehicle-offset 136 is a measure of a distance (not specifically shown) from both a left-side and a right-side (not specifically shown) of the host-vehicle 112 to the lane-marking 118. The controller 132 determines that the lane-departure 138 has occurred when the host-vehicle-offset 136 is less than a threshold 140. The threshold 140 as used herein is defined as a minimum allowable distance from the left-side and/or the right-side of the host-vehicle 112 to the lane-marking 118. The threshold 140 may be user-defined and may be any distance needed to meet the requirements of the host-vehicle 112, and may be in a range from between zero meters (0.0 meters) to 0.75 meters. The threshold 140 may vary based on a width of the host-vehicle 112 and/or may vary based on the width of the travel-lane 124. An occurrence of the lane-departure 138 may be counted 142 by the controller 132 and may be stored in the memory for estimating the operator's 130 lane-keeping-performance.

As illustrated in FIG. 8, the controller 132 also determines an offset-position 144 of the object 122 relative to the lane-marking 118 based on the image 116. The offset-position 144 is defined as the distance from either the left-side or the right-side of the object 122 to the lane-marking 118 of the travel-lane 124 traveled by the host-vehicle 112. The controller 132 also determines an offset-threshold 146 defined as the minimum allowable distance from the left-side and/or the right-side of the object 122 to the lane-marking 118 of the travel-lane 24 traveled by the host-vehicle 12 (shown on the left-side of the object 122 in FIG. 8 for illustration purposes only). The offset-threshold 146 may be user-defined and may be any distance needed to meet the requirements of the host-vehicle 112, and may be in the range from between 0.0 meters to 0.75 meters. The offset-threshold 146 may vary based on a width of the object 122 and/or may vary based on the width of the travel-lane 124, and/or may vary based on the width of the host-vehicle 112.

The controller 132 does not count 142 occurrences of the lane-departures 138 of the host-vehicle 112 when the offset-position 144 is less than the offset-threshold 146 as illustrated in FIG. 8 By not counting 142 the occurrences of the lane-departures 138 under the aforementioned conditions, the system 110 does not penalize the operator 130 of the host-vehicle 112 when the operator 130 makes an intentional lane-departure 138 to provide greater clearance between the host-vehicle 112 and the detected object 122.

Figure 9:
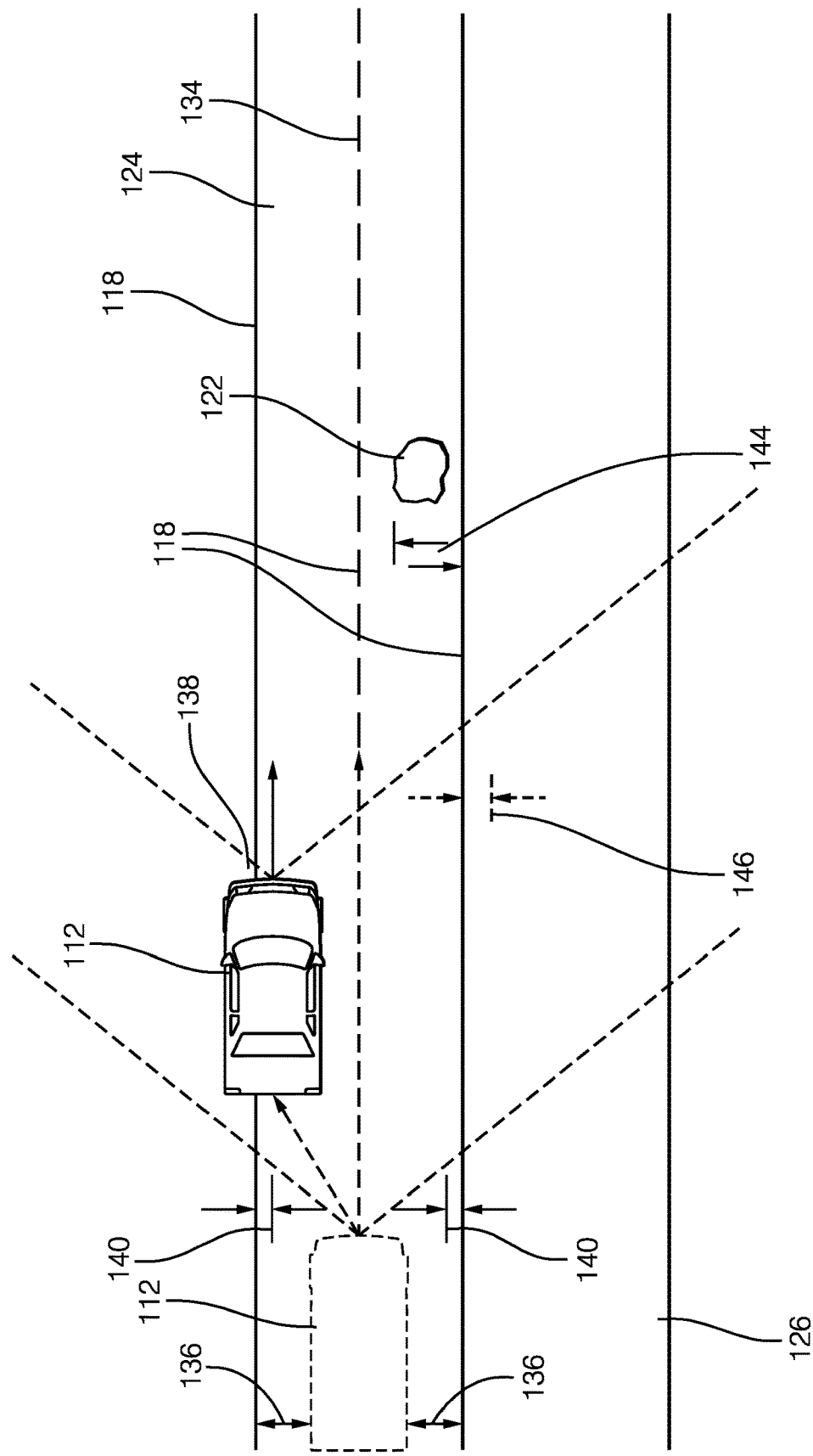
FIG. 9 is an illustration of the host-vehicle of FIG. 8 making a lane-departure in accordance with yet another embodiment.

FIG. 9 illustrates another traffic scenario where the operator 130 of the host-vehicle 112 makes the intentional lane-departure 138 to provide greater clearance between the host-vehicle 112 and the detected object 122 (e.g. a pot-hole and/or debris) located in the travel-lane 124 traveled by the host-vehicle 112 that is perceived as a hazard by the operator 130. As illustrated in FIG. 9, the operator 130 is making the lane-departure 138 to the left-side of the travel-lane 124. The controller 132 does not count 142 the occurrence of the lane-departure 138 when the offset-position 144 (illustrated as a negative value of distance from the lane-marking 118) is less than the offset-threshold 146 as illustrated in FIG. 9. The location of the detected object 122 may urge the operator 30 to make the intentional lane-departure 138 to either-side of the object 122 and will not be counted 142 by the controller 132.

Figure 10:
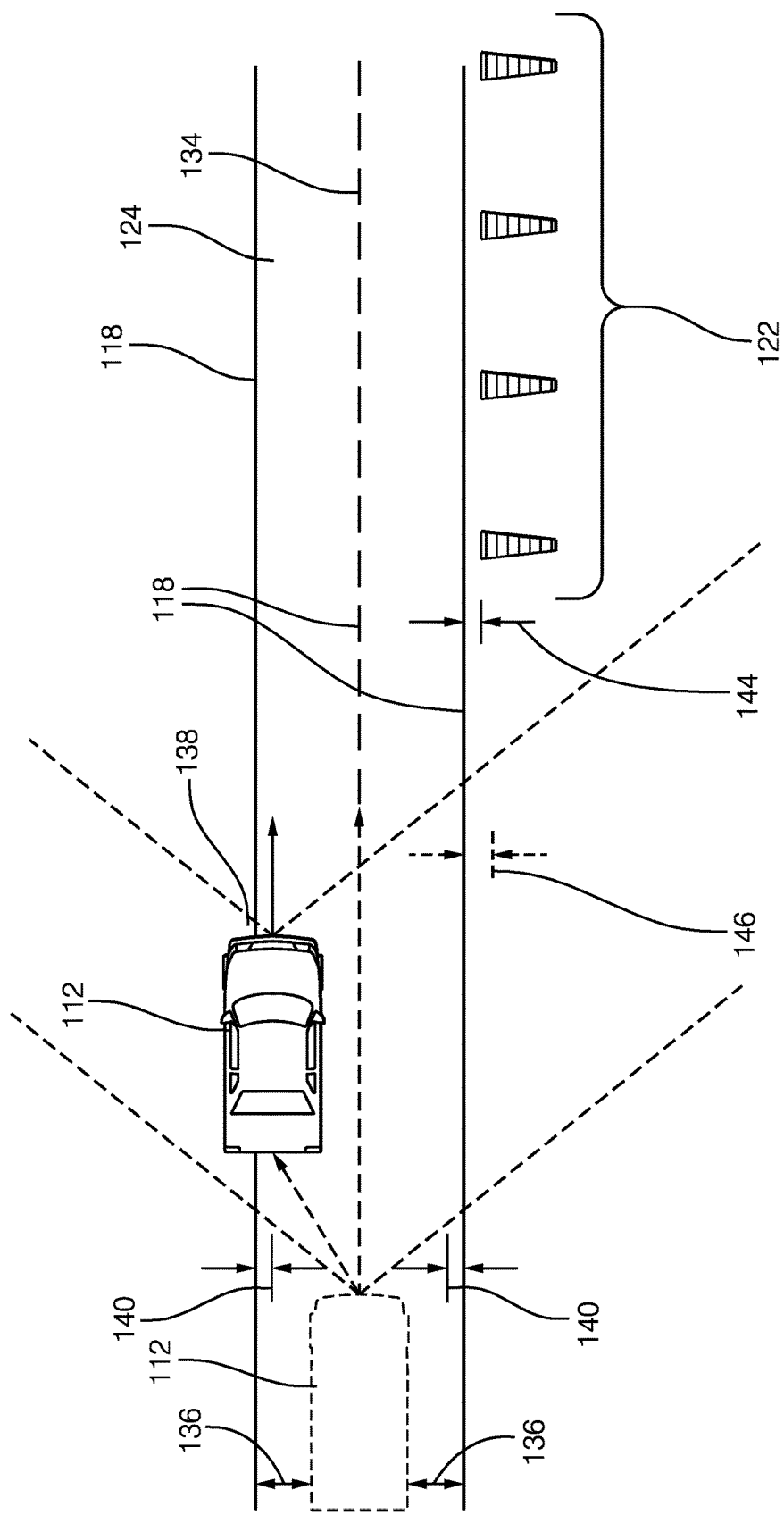
FIG. 10 is an illustration of the host-vehicle of FIG. 8 making a lane-departure in accordance with yet another embodiment.

FIG. 10 illustrates yet another traffic scenario where the operator 130 of the host-vehicle 112 makes the intentional lane-departure 138 to provide greater clearance between the host-vehicle 112 and the detected object 122 (e.g. construction pylons) located on the shoulder of the travel-lane 124 that are perceived as the hazard by the operator 130. As illustrated in FIG. 10, the operator 130 is making the lane-departure 138 to the left-side of the travel-lane 124. The controller 132 does not count 142 the occurrence of the lane-departure 138 when the offset-position 144 is less than the offset-threshold 146.

Figure 11:
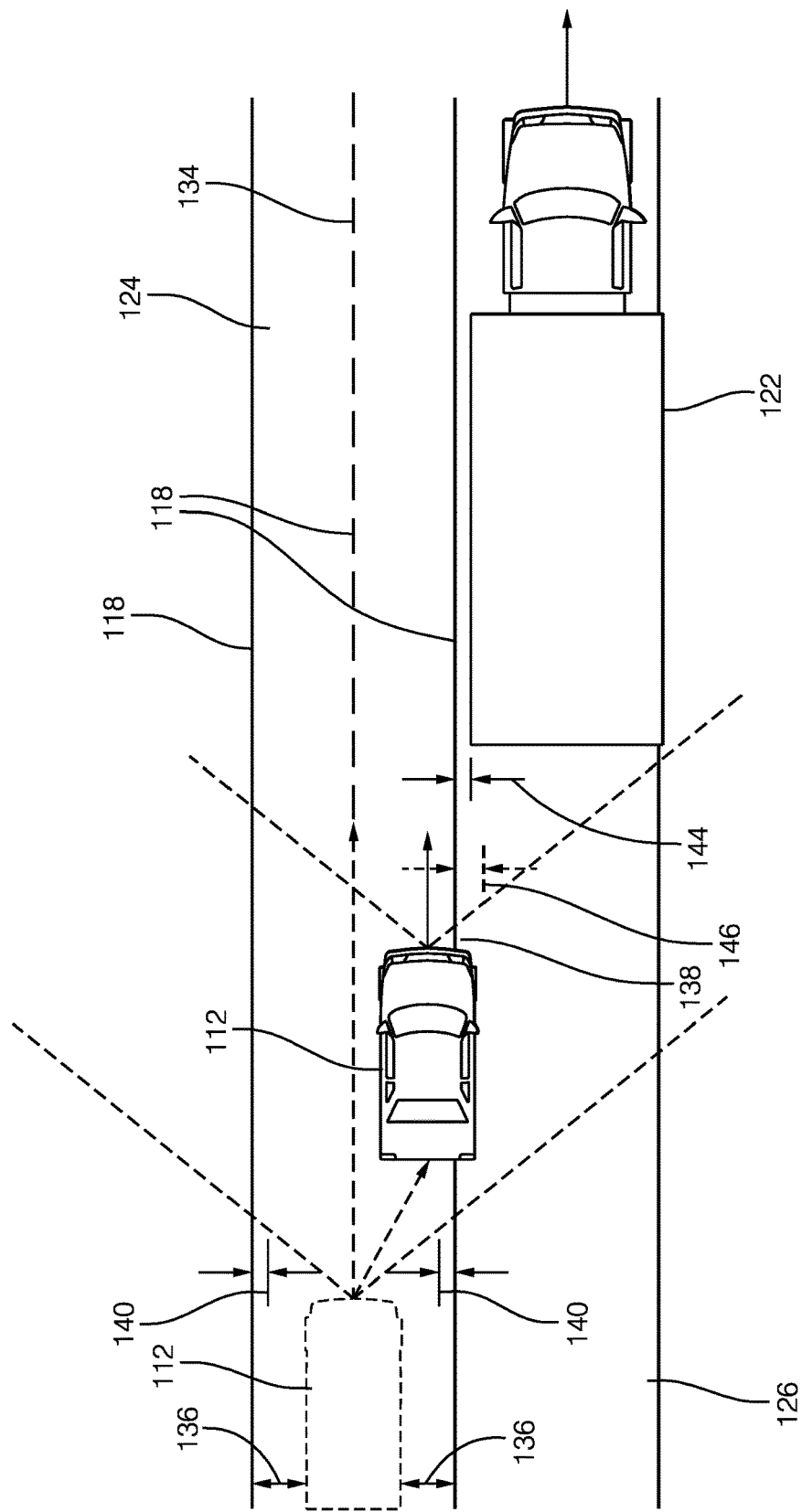
FIG. 11 is an illustration of the host-vehicle of FIG. 8 making a lane-departure in accordance with yet another embodiment.

FIG. 11 illustrates yet another traffic scenario where the controller 132 further determines that the object 122 (e.g. the oversize-load) is in the adjacent-lane 126, and determines that the lane-departure 138 also occurs into the adjacent-lane 126. In contrast to the traffic scenario illustrated in FIG. 8, the controller 132 counts 142 the lane-departure 138 illustrated in FIG. 11 because the host-vehicle 112 moves closer to the object 122 without signaling the maneuver, which may be indicative of driver-fatigue.

The controller 132 activates the alert-device 128 when the count 142 of the occurrences of lane-departures 138 exceeds a departure-threshold 148 (see FIG. 7) indicative of driver-fatigue. The departure-threshold 148 may be any number of occurrences of lane-departures 138 within a defined time-period, and is preferably in the range from between 2 to 3 lane-departures 138 within the time-period of two minutes.

Returning to FIG. 7, the system 110 may further include a ranging-sensor 150 in communication with the controller 132. The ranging-sensor 150 may detect a range 152, and an azimuth-angle 154 of the object 122 relative to a host-vehicle-longitudinal-axis (not shown). The ranging-sensor 150 may be a radar 156 such as the radar-sensor from Delphi Inc. of Troy, Mich., USA and marketed as an Electronically Scanning Radar (ESR) or a Rear-Side-Detection-System (RSDS), or Short-Range-Radar (SRR), or the ranging-sensor 150 may be a lidar 158, or the ranging-sensor 150 may be an ultrasonic-transducer 160 such as the TIDA-00151 from Texas Instruments of Dallas, Tex., USA. The controller 132 may further determine the offset-position 144 of the object 122 based on the range 152 and the azimuth-angle 154, as will be understood by those in the art.

Figure 12:
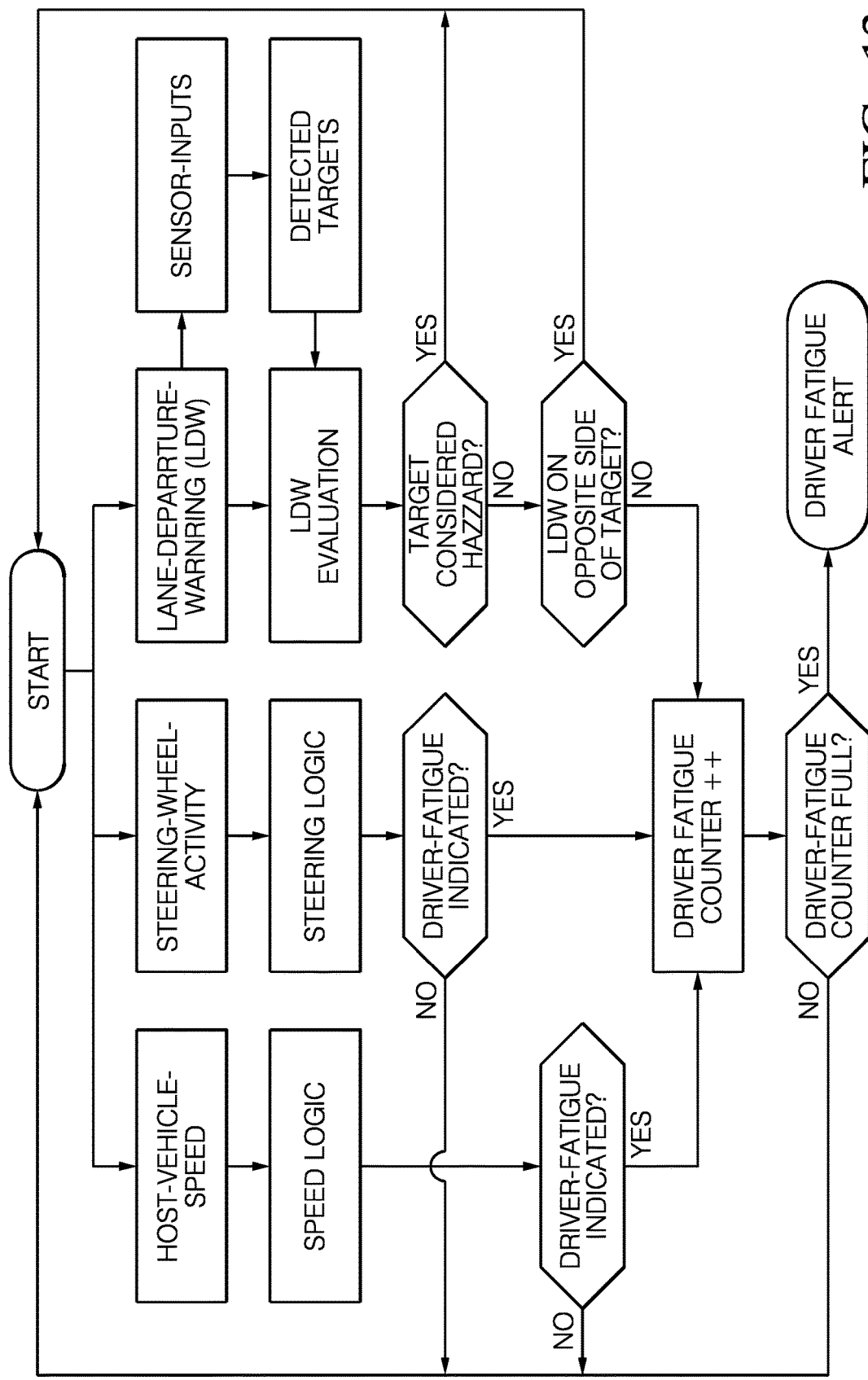
FIG. 12 is a flow chart of a driver-fatigue algorithm in accordance with one embodiment.

FIG. 12 illustrates a non-limiting example of the driver-fatigue algorithm that may be stored in the memory of the controller 32. The driver-fatigue algorithm may include logic that includes making decisions based on sensor input, lane-departure-warnings, steering-wheel-activity, and host-vehicle-speed.

Accordingly, a driver-fatigue warning system 10, a controller 32 for the driver-fatigue warning system 10 and a method 200 of operating the driver-fatigue warning system 10 is provided. The system 10 reduces the rates of the false driver-fatigue warning by determining when to count 42 the lane-departure 38, which may help to reduce occurrences of operators 30 intentionally deactivating the driver-fatigue warning system 10. By not counting 42 the occurrences of the lane-departures 38 under the conditions described above, the system 10 does not penalize the operator 30 of the host-vehicle 12 when the operator 30 makes an intentional lane-departure 38. The operator 30 may make the intentional lane-departure 38 to provide greater clearance between the host-vehicle 12 and the detected object 22 that may be perceived as a hazard by the operator 30.

While this invention has been described in terms of the preferred embodiments thereof, it is not intended to be so limited, but rather only to the extent set forth in the claims that follow.

We claim:

1. A driver-fatigue warning system suitable for use in an automated vehicle, said system comprising:
   a camera that renders an image of a lane-marking and of an object proximate to a host-vehicle;
   an alert-device operable to alert an operator of the host-vehicle of driver-fatigue; and
   a controller in communication with the camera and the alert-device, said controller determines:
      a vehicle-offset of the host-vehicle relative to the lane-marking based on the image;
      an offset-position of the object relative to the lane-marking based on the image; and
      occurrences of a lane-departure when the vehicle-offset is less than a deviation-threshold;
   in accordance with the determination that the lane-departure has occurred, the controller:
      increments a count of occurrences of lane-departures when the offset-position of the object is greater than an offset-threshold;
      does not increment the count of occurrences of lane-departures when the offset-position of the object is less than the offset-threshold and when the lane-departure of the host-vehicle occurs on an opposite side of the travel-lane relative to the object; and
      activates the alert-device when the count of the occurrences of lane-departures exceeds a crossing-threshold indicative of driver-fatigue.

2. The system in accordance with claim 1, wherein the system further includes a ranging-sensor in communication with the controller, said ranging-sensor detects a range, and azimuth-angle of the object, wherein the controller further determines the offset-position based on the range and the azimuth-angle.

3. The system in accordance with claim 2, wherein the ranging-sensor is a radar.

4. The system in accordance with claim 2, wherein the ranging-sensor is a lidar.

5. The system in accordance with claim 2, wherein the ranging-sensor is an ultrasonic-transducer.

6. The system in accordance with claim 1, wherein the controller further determines that the object is in an adjacent-lane and counts the lane-departure when the lane-departure is into the adjacent-lane.

7. The system in accordance with claim 1, wherein the object is another vehicle.

8. The system in accordance with claim 7, wherein the other vehicle is traveling in an adjacent-lane to the travel-lane of the host-vehicle.

9. The system in accordance with claim 1, wherein the object is a stationary object.

10. The system in accordance with claim 9, wherein the stationary object is adjacent to the travel-lane of the host-vehicle.

11. A method of operating a driver-fatigue warning system suitable for use in an automated vehicle, said system comprising:
   rendering, with a camera, an image of a lane-marking and of an object proximate to a host-vehicle;
   alerting, with an alert-device, an operator of the host-vehicle of driver-fatigue; and
   determining, with a controller in communication with the camera and the alert-device, a vehicle-offset of the host-vehicle relative to the lane-marking based on the image;
   determining, with the controller, an offset-position of the object relative to the lane-marking based on the image;
   determining, with the controller, that a lane-departure has occurred when the vehicle-offset is less than a deviation-threshold;
   incrementing a count of occurrences of lane-departures, with the controller, when the offset-position of the object is greater than an offset-threshold;
   not incrementing the count of occurrences of lane-departures, with the controller, when the offset-position is less than an offset-threshold and when the lane-departure of the host-vehicle occurs on an opposite side of the travel-lane relative to the object; and activating the alert-device, with the controller, when the count of the occurrences of lane-departures exceeds a crossing-threshold indicative of driver-fatigue.

12. The method in accordance with claim 11, wherein the system further includes a ranging-sensor in communication with the controller, further including the steps of detecting, with the ranging-sensor, a range, and azimuth-angle of the object, and determining, with the controller, the offset-position based on the range and the azimuth-angle.

13. The method in accordance with claim 11, further including the steps of determining, with the controller, that the object is in an adjacent-lane and counting the lane-departure when the lane-departure is into the adjacent-lane.

14. The system in accordance with claim 11, wherein the object is another vehicle.

15. The system in accordance with claim 14, wherein the other vehicle is traveling in an adjacent-lane to the travel-lane of the host-vehicle.

16. The system in accordance with claim 11, wherein the object is a stationary object.

17. The system in accordance with claim 16, wherein the stationary object is adjacent to the travel-lane of the host-vehicle.

* * * * *